(12) United States Patent
Biester

(10) Patent No.: US 7,469,877 B2
(45) Date of Patent: Dec. 30, 2008

(54) THROTTLE DEVICE

(75) Inventor: Klaus Biester, Wienhausen (DE)

(73) Assignee: Cameron International Corporation, Houston, TX (US)

( * ) Notice: Subject to any disclaimer, the term of this patent is extended or adjusted under 35 U.S.C. 154(b) by 38 days.

(21) Appl. No.: 11/614,195

(22) Filed: Dec. 21, 2006

(65) Prior Publication Data

US 2007/0096047 A1    May 3, 2007

Related U.S. Application Data

(63) Continuation of application No. 10/525,619, filed as application No. PCT/EP03/09698 on Sep. 1, 2003, now Pat. No. 7,175,156.

(30) Foreign Application Priority Data

Aug. 30, 2002   (DE) ................................ 202 13 365

(51) Int. Cl.
    F16K 47/00    (2006.01)
    F16K 1/16     (2006.01)
    F16L 55/02    (2006.01)
(52) U.S. Cl. ........................ 251/120; 251/298
(58) Field of Classification Search .............. 123/336, 123/337, 361, 399, 403; 251/120, 129.11, 251/298, 305, 306; 137/557, 624.11, 624.18, 137/625, 625.44, 630.14
See application file for complete search history.

(56) References Cited

U.S. PATENT DOCUMENTS

| 4,909,212 | A | * | 3/1990 | Minowa et al. | 123/337 |
|---|---|---|---|---|---|
| 5,379,738 | A | * | 1/1995 | Laimbock et al. | 123/337 |
| 5,749,335 | A | * | 5/1998 | Flanery et al. | 123/337 |
| 6,712,040 | B1 | * | 3/2004 | Giffin | 123/336 |
| 7,021,264 | B2 | * | 4/2006 | Giffin | 123/336 |
| 7,175,156 | B2 | * | 2/2007 | Biester | 251/120 |
| 2005/0139192 | A1 | * | 6/2005 | Lechner | 123/336 |

* cited by examiner

*Primary Examiner*—Willis R Wolfe, Jr.
(74) *Attorney, Agent, or Firm*—Conley Rose, P.C.

(57) ABSTRACT

A throttle device comprises a device housing with an inlet and an outlet and a throttle element arranged in a connecting duct connecting the inlet and the outlet, said throttle element comprising at least two throttle components to be adjusted relative to one another and by the relative position of which an opening surface of the throttle element is determined, at least the first throttle component being actively connected with a drive means for an adjustment relative to the second throttle component. In order to guarantee with a simplified construction a safe operation of the throttle device without the risk of a choking of the corresponding throttle element and to simultaneously realize a simple possibility of movement for the throttle components, the throttle components are throttling discs to be rotated relative one to another at least one of which being movably connected with a rotary adjustment device of the drive means, the throttling discs each comprising at least one throttle opening the overlap of which determines the opening surface depending on the relative position of the throttling discs.

21 Claims, 2 Drawing Sheets

THROTTLE DEVICE

CROSS-REFERENCE TO RELATED APPLICATIONS

This application is a continuation application of application Ser. No. 10/525,619 filed Feb. 25, 2005, now U.S. Pat. No. 7,175,156; and a National Phase entry of PCT Application No. PCT/EP2003/009698 filed 1 Sep. 2003 which claims priority to German Application No. 202 13.365.6 filed 30 Aug. 2002, both of which are incorporated herein by reference. This application is related to the following applications: PCT Application No. PCT/EP2003/009701 filed 1 Sep. 2003 which claims priority to German Application No. 202 13 391.5 filed 30 Aug. 2003; PCT/EP2003/009700 filed 1 Sep. 2003 which claims priority to German Application No. 202 13 393.1 filed 30 Aug. 2002; PCT Application No. PCT Application No. PCT/EP2003/009697 filed 1 Sep. 2003 which claims priority to German Application No. 202 13 389.3 filed 30 Aug. 2002; PCT Application No. PCT/EP2003/ 009696 filed 1 Sep. 2003; which claims priority to German Application No. 202 13 364.8 filed 30 Aug. 2002; PCT Application No. PCT/EP2003/009699 filed 1 Sep. 2003 which claims priority to German Application No. 202 13 388.5 filed 30 Aug. 2002; and U S. application Ser. No. 10/836,559 filed 30 Apr. 2004, all of which are incorporated herein by reference.

STATEMENT REGARDING FEDERALLY SPONSORED RESEARCH OR DEVELOPMENT

Not applicable.

BACKGROUND OF THE INVENTION

The invention relates to a throttle device with a device housing comprising an inlet and an outlet and with a throttle element arranged in a connecting duct connecting the inlet and the outlet, said throttle element comprising at least two throttle components to be adjusted relative to one another and by the relative position of which an opening surface of the throttle element is determined, at least a first throttle component being actively connected with a drive means for an adjustment relative to the second throttle component.

Such a throttle device can, for example, be employed in an apparatus for the gas or oil production which can be arranged at inaccessible places, such as underneath sea level or even on the ocean bed. By a corresponding adjustment of the throttle device and thus an adjustment of the corresponding opening surface of the throttle element, the passage of the fluid to be transported is determined by a connecting duct in the device housing connecting the inlet and the outlet.

In order to be able to adjust the opening surface of the throttle element, the same normally comprises two throttle components to be adjusted relative one to another. One throttle component can, for example, have a sleeve-like design and comprise corresponding openings in the sleeve walls which are more or less covered and thus closed by the other throttle component also having a sleeve-like design. Depending on the arrangement of the two sleeve-like throttle components one upon the other, thus the opening surface of the throttle element and thus of the passage through the throttle device is determined.

In this throttle device known from practice, the mechanical movement of the two throttle components is rather complicated and it is possible that due to the impurities entrained in the fluid to be transported the throttle device and in particular the throttle element get choked at least partially. The mounting of the throttle components, too, is relatively complicated.

SUMMARY OF THE INVENTION

It is therefore an object of the invention to improve a throttle device of the type mentioned in the beginning in that the same guarantees a safe operation of the throttle device at the same time having a simplified design and not bearing the risk of the corresponding throttle element getting choked, and in that simultaneously the possibility of a simple movement of the throttle components is realized.

This object is achieved by the features of claim 1.

According to the invention, the throttle components are designed as throttling discs to be rotated relative one to another. One or two of these discs is/are movably connected with a rotary adjustment device of the drive means. By correspondingly rotating the throttling discs relative to one another, each of the throttling discs comprising at least one throttle opening, the overlap of these throttle openings is varied and thus the opening surface of the throttle element is determined.

The use of discs as throttle components results in a small size of the throttle element and simultaneously in a safe operation, as it is easily possible to rotate the discs in opposite directions even if impurities are entrained in the fluid to be transported, so that an at least partial choking of the throttle device is largely excluded.

In order to give the throttle device according to the invention an even simpler design, only one of the throttling discs can be movably connected with the drive means, so that, for example, the first throttling disc is fixed relative to the device housing. By a pure rotation of the second throttling disc, this results in a corresponding adjustment of the opening surface of the throttle element.

In order to keep the influence on the flow between inlet and outlet through the connecting duct by the throttle element as low as possible and optionally not to deflect it, the first throttling disc can form a part of the connecting duct with its at least one throttle opening. That means that the corresponding throttle opening leads through the connecting duct between inlet and outlet without changing the flow direction of the fluid.

In order to be able to arrange the throttling discs in the device housing in a simple manner, adjacent to the outlet, a fixation disc can be inserted in particular detachably in the device housing, the first throttling disc being stationarily fixed to the fixation disc. This makes it possible to remove the first throttling disc by simply detaching the fixation disc in the device housing and to possibly replace it by another first throttling disc. One can do without the fixation of the first throttling disc directly at the device housing resulting in a simple design of the first throttling disc.

In this connection, it can be furthermore considered to be favorable for the fixation disc to comprise an essentially centric hole also forming a part of the connecting duct.

In order to be able to more easily discharge fluid transported through the throttle device via the outlet, the hole of the fixation disc can be expanded towards the outlet.

Analogously, the design is further simplified if the second rotating throttling disc is arranged directly adjacent to the first throttling disc and forms a part of the connecting duct with its at least one throttle opening. In this manner, the second throttling disc and its throttle opening do not deflect or deviate the fluid flowing from the inlet to the outlet.

In order to be able to arrange the throttle element formed by the two throttling discs at an adequate distance to the inlet, the rotary adjustment device can be movably connected with the second throttling disc via a connecting sleeve as operating element of the throttle element forming a part of the connecting duct and being inserted in the device housing. The connecting sleeve is correspondingly rotatably mounted in the device housing, its rotation being transmittable to the second throttling disc.

In order not to need any further additional component in the area of the inlet, the inlet can be formed in the area of the connecting sleeve.

In order to be able to securely supply fluid from the inlet to the connecting duct, the inlet can have an inlet sleeve which projects into the connecting duct through a guiding slot in the connecting sleeve. In this case, the inlet sleeve can optionally extend towards the outlet at its end facing the connecting duct, so that the fluid flow is deflected towards the outlet already by the inlet sleeve.

In order to be able to guarantee an adequate rotation of the second throttling disc, the guiding slot can essentially extend at an angle of 180° in the circumferential direction of the connecting sleeve. That means that the connecting sleeve can be rotated by essentially 180° and the second throttling disc can also be correspondingly rotated by 180°.

It is of course possible to give the guiding slot a shorter or longer design.

Various rotary adjustment devices via which a revolution of a drive means can be transmitted into a corresponding and possibly geared down revolution of the connecting sleeve or the second throttling disc, respectively are known. A rotary adjustment device comprising a fixed sleeve fixed relative to the device housing and a rotary sleeve to be rotated relative thereto requires only little space. In this case, the rotary sleeve is connected on the one hand with the connecting sleeve and on the other hand with the drive means. Due to the sleeve-like design of the rotary adjustment device, there still remains some space in the interior of the sleeves for accommodating other means of the throttle device.

A simple possibility of rotating the rotary sleeve by means of the fixed sleeve can be seen in that at least one slot is formed each in the fixed sleeve and the rotary sleeve, which slots comprise different inclinations in the longitudinal direction of the sleeve and overlap each other at least for receiving an insertion element, the insertion element being movable by the drive means. If the insertion element is moved along the slot of the fixed sleeve, it is forcibly also moved along the slot of the rotary sleeve and due to the different inclinations of these slots, the rotary sleeve rotates relative to the fixed sleeve. One possibility of realizing these different inclinations is to dispose the corresponding slots in an X-shape.

In order to move the insertion element along the slots in a simple manner, it can project essentially radially to the outside from a rotating spindle or a nut of a screw. If it projects from the rotating spindle, its rotary and lengthwise motion is converted into a corresponding movement of the insertion element and transmitted to the rotary sleeve due to the guidance along the slots.

Preferably, this screw is a ball screw consisting of rotating spindle and ball nut.

In order to give the ball screw a more stable design, the rotating spindle can be mounted in the device housing to be rotated but not to be shifted axially. In this case, the insertion element is moved by the ball nut.

In a simple embodiment in this connection, the ball nut can move along the rotating spindle and be rotated about the same.

For rotating the rotary sleeve not only at one spot by the action of a corresponding insertion element and for avoiding a possible jamming of the rotary sleeve relative to the fixed sleeve, two insertion elements can project essentially opposite to one another outside from the ball nut and engage in correspondingly arranged slot pairs of rotary sleeve and fixed sleeve.

For a better guidance of the insertion elements along the slots, it is moreover possible that the insertion elements comprise friction-reducing supports or pivot rests which roll off along the slots when the insertion elements are adjusted.

The construction of the rotary adjustment device can be further simplified if the rotary sleeve is rotatably mounted in the device housing at both its ends. Moreover, a rotating bedding (bearing) can be provided between rotary sleeve and fixed sleeve. It is also possible for the two sleeves to be adequately spaced, so that there is no friction in case of their relative rotation.

In order to be able to mount the rotating spindle in the device housing in a simpler way, at its front end facing the operating element, the rotary sleeve can comprise an annular flange projecting radially to the inside where one end of the rotating spindle is rotatably mounted.

The corresponding other end of the rotating spindle is movably connected with the drive means. At the corresponding spot of the movable connection, the rotating spindle can also be rotatably mounted.

In order to be able to arrange the throttling discs relatively easily in the device housing and to stationarily connect it there with the corresponding component, each throttling disc can be stationarily connected with its respective associated component, in particular by a number of pins. That means that, for example, the fixed throttling disc is stationarily connected with the fixation disc by pins correspondingly arranged between them and the second throttling disc is stationarily connected with the rotating connecting sleeve also by pins arranged between them. The two throttling discs are, for example, in frictional abutment to one another, preferably both throttling discs having the same dimensions and in particular the same diameters.

An edge of the respective throttling discs can be formed for this rotary attachment by means of pins, while the remaining disc plane can serve for receiving a number of throttle openings.

The construction of the throttle device according to the invention can furthermore be simplified in that the throttling discs have the same design per se and it is, for example, determined only by a corresponding connection with the associated component which one is employed as first and which one as second throttling disc. This can, for example, be effected in that the same number and/or the same shape and/or the same size of throttle openings are arranged in the throttling discs.

A simple possibility of varying the throttle surface of the throttle element by only a few throttle openings and with an only slight rotation of the throttling discs one to another can be seen in that the throttle openings are designed in a circumferential direction of the throttling discs with growing opening surfaces. Such throttle openings comprise, for example, a drop-shaped cross-section or the like.

BRIEF DESCRIPTION OF THE DRAWINGS

In the following, advantageous embodiments of the invention are illustrated more in detail with reference to the figures enclosed in the drawings.

In the drawings.

DESCRIPTION OF THE PREFERRED EMBODIMENTS

Figure 1:
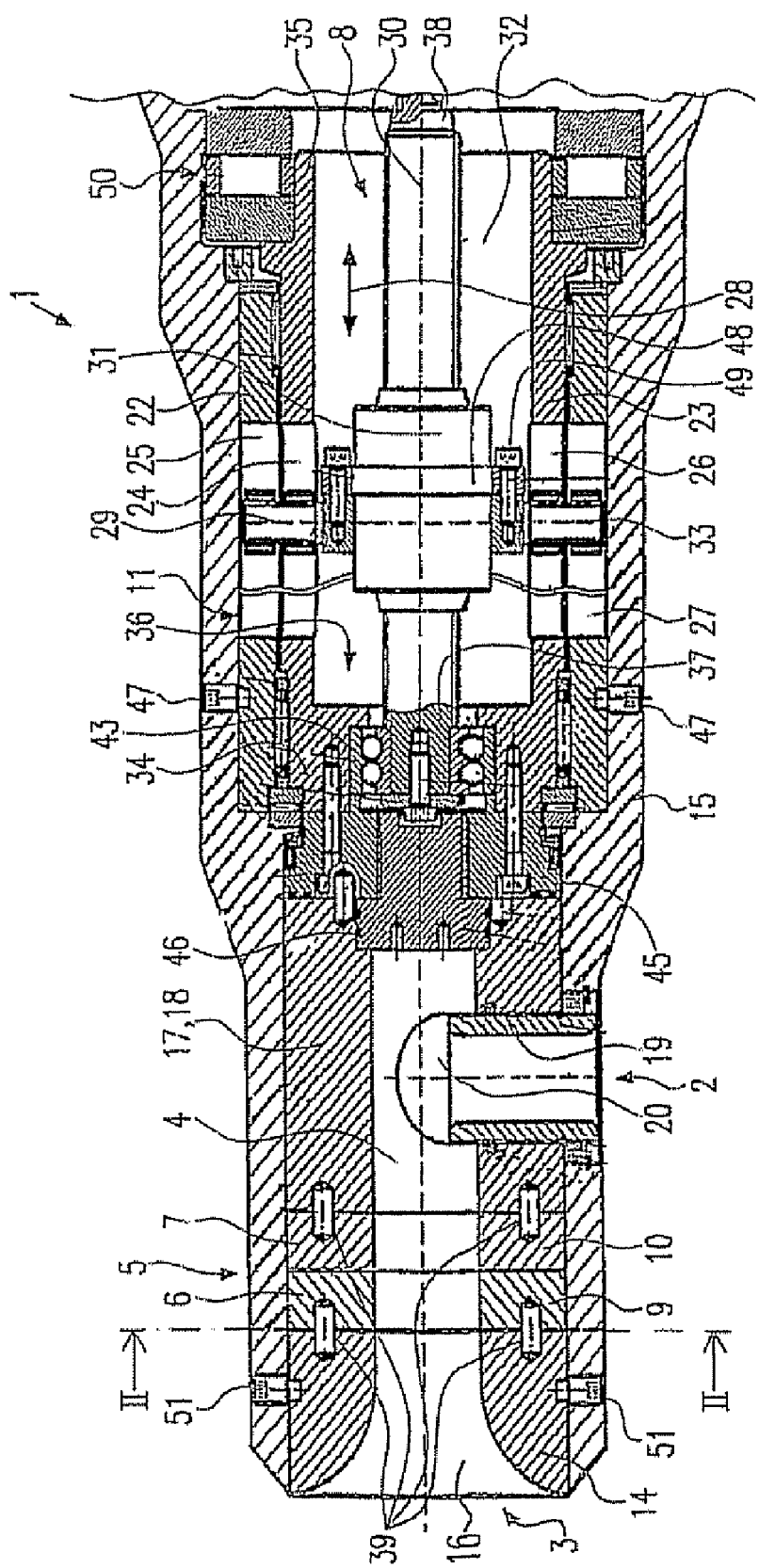
FIG. 1 shows a longitudinal section through a throttle device according to the invention corresponding to a section along line I-I of FIG. 2.
Figure 2:
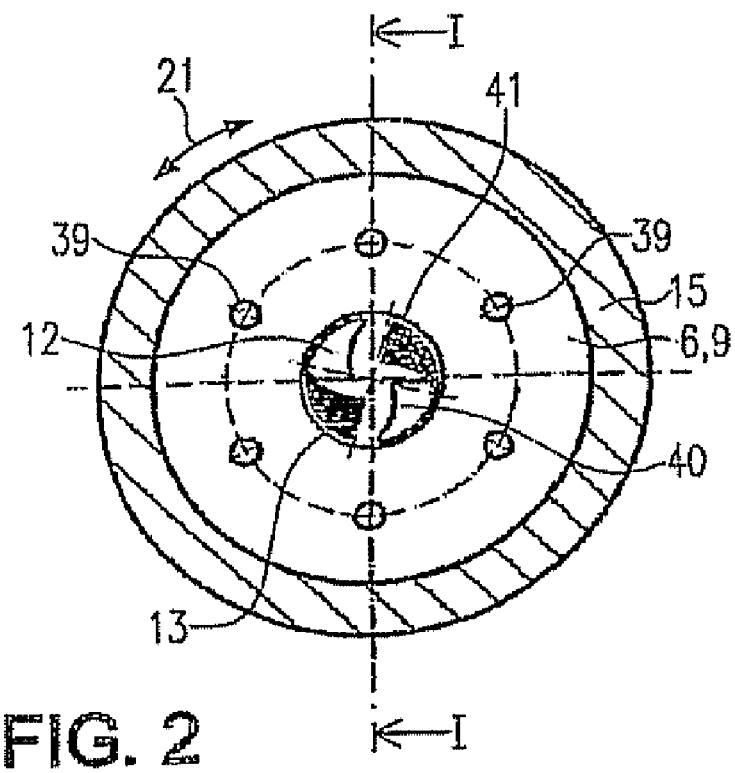
FIG. 2 shows a section along line II-II of FIG. 1.

In FIG. 1, a longitudinal section along line I-II of FIG. 2 through an embodiment of a throttle device 1 according to the invention is represented. It comprises a device housing 15 which is essentially only depicted in the area to be inserted into a corresponding apparatus of the gas or oil production. At its outer side, the device housing comprises a cross-section reduced in degrees by means of fitting surfaces which permits in a simple manner an insertion of the throttle device 1 into such apparatuses even by means of a telecontrolled vehicle at inaccessible places.

In FIG. 1, the device housing 15 comprises at its left end an outlet 3 which is in communication with an inlet 2 laterally arranged at the housing via a connecting duct 4 within the device housing 15. A throttle element 5 is arranged between inlet and outlet and within the connecting duct 4. It comprises two throttle components 6, 17 which are designed as throttling discs 9, 10 to be rotated in opposite directions. The first throttling disc 9 is stationarily arranged relative to the device housing 15. This stationary arrangement is effected via pins 39 arranged between the first throttling disc 9 and a fixation disc 14. The fixation disc 14 is stationarily held by studs or stop pins 51 with a hexagon socket screwed into the device housing 15 from the outside. The fixation disc 14 comprises an internal bore 16 forming a part of the connecting duct 4 and being expanded towards the outlet 3.

The second throttling disc 10 is arranged directly adjacent to and in abutment with the first throttling disc 9. There is no connection between them, so that the second throttling disc 10 can be rotated within the device housing 15. The corresponding throttle openings 12, 13, 40, 41, too, see FIGS. 2 and 3, in the throttling discs 9, 10 form a part of the connecting duct 4.

Towards the inlet 2, a connecting sleeve 17 follows the second throttling disc 10, which is also rotatably mounted in the device housing and with its central hole or opening forms a part of the connecting duct 4. The inlet 2 is arranged in the area of the connecting sleeve 17. It comprises an inlet sleeve 19 which flushes with the outside of the device housing and projects into the connecting duct 4 with its internal end. The inlet sleeve 19 is sealed with respect to the device housing and with respect to the connecting sleeve 17.

Within the connecting sleeve 17, in the area of the inlet sleeve 19, a guiding slot 20 is arranged, which, in the represented embodiment, extends approximately by 180° in the circumferential direction 21, see FIG. 2, of the device housing or the connecting sleeve 17.

The connecting sleeve 17, as operating element 18 for the throttle element 5, is movably connected with a rotary adjustment device 11 at its side opposed to the second throttling disc 10. The motion connection is effected via a supporting ring 45 which is arranged between the rotary adjustment device 11 and the connecting sleeve 17 and is detachably mounted in particular at the rotary adjustment device 11. The rotary connection between the connecting sleeve 17 and the supporting ring 45 is in turn effected via pins 39.

The connecting duct 4 ends opposite the inlet 3 at a cap 46 which is inserted in a corresponding opening of the supporting ring 45.

The rotary adjustment device 11 is formed by two sleeves. A first fixed sleeve 22 is arranged within the device housing 15 in the longitudinal direction 28 of the sleeve and cannot be rotated or shifted. The rotary attachment is effected by stop pins 47 which can comprise a hexagon socket and are screwed through the device housing 15 from the outside. These pins 7 and the stop pins 51 do not project over a corresponding outside wall of the device housing.

With its ends, the fixed sleeve 22 is in abutment with a corresponding step in the interior of the device housing or with a separate stop, so that it cannot be shifted in the longitudinal direction 28. A rotary sleeve 23 is arranged within the fixed sleeve 22. At its front end 34 facing the operating element 18, it is detachably connected with the supporting ring 45 by means of studs or the like. At the front end 34 of the rotary sleeve 23, furthermore an annular flange 36 radially projecting to the inside is formed, in which a pivot rest 43 for rotatably mounting a rotating spindle 30 is arranged. One end 37 of the rotating spindle 30 is detachably connected with the pivot rest 43. The rotating spindle is rotatably held by the connection with the pivot rest 43, but it cannot be shifted in the longitudinal direction 28 of the sleeve. At the rear end 35 of the rotary sleeve 23 a bearing device 50 is arranged.

A ball nut 31 is mounted on the rotating spindle 30 and can be shifted in the longitudinal direction 28 of the sleeve and also rotated about the rotating spindle 30. The rotating spindle 30 and ball nut 32 form a ball screw 32.

The other end 38 of the rotating spindle 30 is connected with a corresponding motor of the drive means 8 of the throttle device 1, such a motor or else a plurality of such motors not being depicted in FIG. 1 for simplification. The connection of these motors with the rotating spindle 30 can be effected directly or else by inserting one or more step-down gear units. Examples of such step-down gear units are a harmonic drive, a worm gear pair, a double helical gearing and the like.

The nut and counternut 31 comprise at their outer side, a straining ring 48 with which a supporting ring is connected via studs 49. Two insertion elements 29, 33 project from this supporting ring essentially radially to the outside relative to the ball nut 31. The insertion elements 29, 33 engage slot pairs 24, 25 and 26, 27 on opposite sides of the ball nut 31. Slots 24, 26 are formed in the rotary sleeve 23 and slots 25, 27 are formed in the fixed sleeve 22, respectively. The slots of rotary sleeve and fixed sleeve comprise different inclinations in the longitudinal direction 28, the corresponding slots being, for example, arranged in an X-shape.

In FIG. 2, a section along line II-II of FIG. 1 is shown. The section goes through the throttle element 5, so that the arrangement of the throttle opening 12, 13, 40, 41 can be seen in both throttling discs 9, 10. The throttling discs 9, 10 are, also see the descriptions to FIG. 1, stationarily connected with the respective corresponding component, see fixation disc 14 or connecting sleeve 17, respectively, by a number of pins 39.

In the respective disc plane, the throttle openings are arranged in the area of the connecting duct 4. In the shown embodiment in FIG. 2, for example, there are two throttle openings 12, 14 in the first throttling disc 9 and corresponding throttle openings 13, 41 in the second throttling disc 10. The throttle openings comprise an opening surface 42 growing in the circumferential direction 21. In the position of the first and second throttling discs 9, 10, shown in FIG. 2, the throttle openings of the various discs do not overlap, so that the connecting duct 4 is closed.

Figure 3:
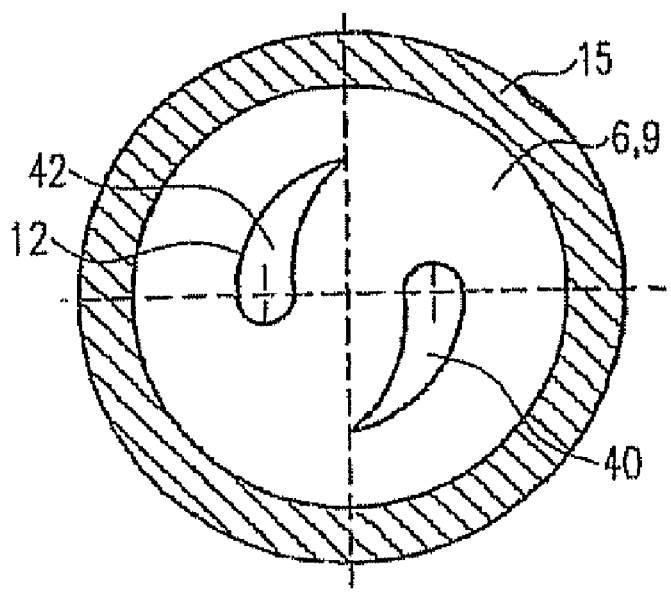
FIG. 3 shows a section analogously to FIG. 2 through another embodiment of the throttle device according to the invention.

In FIG. 3, a second embodiment for throttling discs with another design of throttle openings is shown. They are essentially drop-shaped and extend approximately in the circumferential direction 21, see FIG. 2. In this case, too, the opening surface is getting larger in one circumferential direction.

Further shapes for the throttle openings are obvious. It should, however, be ensured that in at least one position of the throttling discs 9, 10 relative one to another, there is no overlap of the throttle openings of the various discs, so that a closing of the connecting duct 4 is ensured.

In the following, in brief the functioning of the throttle device according to the invention is described with reference to the Figures.

If a revolution is transmitted to the rotating spindle 30 by one or several non-depicted drive motors of the drive means 8, the ball nut 31 moves in the longitudinal direction 28 of the sleeve and also rotates about the rotating spindle 30 due to the engagement of the insertion elements 29, 33 in the slots 25, 27 of the fixed sleeve 22. As the insertion elements 29, 33 also engage the slots 24, 26 of the rotary sleeve 23, by the guidance of the insertion elements along the slots in the fixed sleeve, the rotary sleeve is correspondingly rotated. When the rotary sleeve 23 is rotated, the supporting ring 45 stationarily connected thereto and the connecting sleeve 17 as operating element 18 of a throttle element 5 stationarily connected thereto, are also rotated. Due to the stationary connection with the second throttling disc 10, the rotation of the connecting sleeve 17 is transmitted thereto. This results in a relative adjustment of the second throttling disc to the first throttling disc 9, which is stationarily arranged in the device housing 15 by means of the fixation disc 14. When the two throttling discs 9, 10 are rotated relative to one another, there also is a relative rotation of the throttle openings 12, 40 and 13, 41 formed in the respective throttling disc. This relative motion results in a different overlap of the throttle opening, the overlap being between zero and a maximum value which is essentially achieved in that the throttle openings of the different throttling discs overlap completely. Thereby, the connecting duct 4 can be closed or opened between the inlet 2 and the outlet 3, the maximal opening surface corresponding to the maximal overlap surface of the throttle openings.

The invention claimed is:

1. An apparatus for adjusting flow, the apparatus comprising:
   a housing having a passageway with a passageway flow area and an axis;
   the housing having a portion extending across the passageway, the portion having an opening therethrough;
   a disc rotatably disposed in the passageway adjacent the portion and having an aperture therethrough, the disc having an axis of rotation parallel with the axis of the passageway;
   the opening and aperture overlapping to form a flow area through the housing; and
   drive means connected to the member to adjust the position of the aperture with respect to the opening to adjust the flow area.

2. An apparatus for adjusting flow, the apparatus comprising:
   a housing having a passageway with an inlet an outlet;
   a first component disposed in the passageway and having a first aperture therethrough;
   a second component disposed in the passageway and having a second aperture therethrough;
   the first and second apertures forming an adjustable opening in the passageway;
   the first and second components being adjustable relative to one another to adjust the opening and the flow through the passageway;
   wherein the first aperture of the first component is a centric hole forming a part of the passageway; and
   wherein the hole is expanded towards the outlet.

3. An apparatus for adjusting flow, the apparatus comprising:
   a housing having a passageway with an inlet and an outlet;
   a first component disposed in the passageway and having a first aperture therethrough;
   a second component disposed in the passageway and having a second aperture therethrough;
   the first and second apertures forming an adjustable opening in the passageway;
   the first and second components being adjustable relative to one another to adjust the opening and the flow through the passageway; and
   wherein at least one of the first and second components has a disc with a number of apertures arranged in the plane of the disc.

4. An apparatus for the adjusting flow, the apparatus comprising:
   a housing having a passageway with an inlet and an outlet;
   a first component disposed in the passageway and having a first aperture therethrough;
   a second component disposed in the passageway and having a second aperture therethrough;
   the first and second apertures forming an adjustable opening in the passageway;
   the first and second components being adjustable relative to one another to adjust the opening and the flow through the passageway;
   further comprising a drive means to move the first and second components relative to one another to adjust the opening;
   wherein the drive means includes a rotary adjustment assembly;
   wherein the rotary adjustment assembly includes a connecting sleeve connected to the second component and forming a part of the passageway in the housing;
   wherein flow through the inlet passes through the connecting sleeve; and
   wherein the inlet includes an inlet sleeve projecting into the passageway through an orifice in the connecting sleeve.

5. The apparatus of claim 4, wherein the orifice is a slot that extends over an angle of 180° in the circumferential direction of the connecting sleeve.

6. The apparatus of claim 4, wherein the rotary sleeve includes an annular flange projecting radially inwardly with one end of the rotating spindle being rotatably mounted in the annular flange.

7. An apparatus for adjusting flow, the apparatus comprising:
   a housing having a passageway with an inlet and an outlet;
   a first component disposed in the passageway and having a first aperture therethrough;
   a second component disposed in the passageway and having a second aperture therethrough;
   the first and second apertures forming an adjustable opening in the passageway;
   the first and second components being adjustable relative to one another to adjust the opening and the flow through the passageway;

further comprising a drive means to move the first and second components relative to one another to adjust the opening;

wherein the drive means includes a rotary adjustment assembly;

wherein the rotary adjustment assembly includes a fixed sleeve fixed relative to the housing and a rotary sleeve rotatable relative to the housing, the rotary sleeve being movably connected to the connecting sleeve and to the drive means; and further including at least one slot in the fixed sleeve and one slot in the rotary sleeve, the slots having inclinations in a longitudinal direction of the sleeves and overlapping at least to receive an insertion element, which is movable by the drive means.

8. The apparatus of claim 7, wherein the insertion element projects essentially radially to the outside from a rotating spindle or a ball nut of a screw to form a ball screw.

9. The apparatus of claim 8, wherein the insertion elements project outside from the ball nut essentially opposite to one another and engage in correspondingly arranged slot pairs of the rotary sleeve and fixed sleeve.

10. An apparatus for adjusting flow, the apparatus comprising:
a housing having a longitudinal passageway with an inlet and an outlet and a passageway flow area;
a first component perpendicularly disposed in the longitudinal passageway and having a first aperture therethrough with an aperture flow area smaller than the passage way flow area;
a second component perpendicular disposed in the passageway and having a second aperture therethrough, the second component being a disc perpendicularly disposed in the passageway and co-axial with the first component;
the first and second apertures forming an adjustable opening in the longitudinal passageway; and
the first and second components being adjustable relative to one another to adjust the opening and the flow through the passageway.

11. The apparatus of claim 10 wherein the second aperture of the disc overlaps the first aperture to form variable adjustable opening having a maximum flow area less than the passageway flow area.

12. The apparatus of claim 10 wherein the disc is disposed coaxially and adjacent to the first component perpendicularly to the longitudinal passageway to form the opening.

13. The apparatus of claim 10, wherein the first aperture of the first component is a centric, non-circular cross sectioned hole forming a part of the longitudinal passageway.

14. The apparatus of claim 10, wherein the same number and/or the same shape and/or the same size of apertures are arranged in the first and second components, the apertures being non-circular in cross section and overlapping.

15. The apparatus of claim 10, wherein the first component is a disc and the first and second apertures are formed in the discs of the first and second components in a circumferential direction of the components with a growing opening surface.

16. The apparatus of claim 10, further comprising a drive means to rotate the disc relative to the first component to adjust the opening.

17. The apparatus of claim 16 wherein the first component is fixed and the disc is rotatable, the disc being connected to the drive means.

18. The apparatus of claim 16, wherein the drive means includes a rotary adjustment assembly.

19. The apparatus of claim 18, wherein the rotary adjustment assembly includes a fixed sleeve fixed relative to the housing and a rotary sleeve rotatable relative to the housing, the rotary sleeve being movably connected to the connecting sleeve and to the drive means.

20. The apparatus of claim 18, wherein the rotary adjustment assembly includes a connecting sleeve connected to the disc and forming a part of the longitudinal passageway in the housing.

21. The apparatus of claim 20, wherein flow through the inlet passes through the connecting sleeve.

* * * * *